(12) United States Patent
Jameson

(10) Patent No.: US 9,238,432 B1
(45) Date of Patent: Jan. 19, 2016

(54) CUSTOMIZABLE MODULATOR FOR VEHICULAR BRAKING INDICATION

(71) Applicant: Genesis Systems, LLC, Marana, AZ (US)

(72) Inventor: George Jameson, Marana, AZ (US)

(73) Assignee: Genesis Systems, LLC, Marana, AZ (US)

( * ) Notice: Subject to any disclaimer, the term of this patent is extended or adjusted under 35 U.S.C. 154(b) by 0 days.

(21) Appl. No.: 14/831,537

(22) Filed: Aug. 20, 2015

(51) Int. Cl.
| | |
|---|---|
| B60Q 1/44 | (2006.01) |
| B60Q 1/26 | (2006.01) |
| B60Q 1/50 | (2006.01) |
| G01C 5/00 | (2006.01) |
| G05D 1/00 | (2006.01) |
| B62K 11/00 | (2006.01) |

(52) U.S. Cl.
CPC ........................................ *B60Q 1/44* (2013.01)

(58) Field of Classification Search
CPC ............ B60Q 1/44; B60Q 1/22; B60Q 1/444; B60Q 1/2603; B60Q 1/50; G01S 13/931; G01C 5/005; B60R 21/0132; B60G 17/0195; B60T 8/1755; B62M 23/00
USPC ......... 340/479, 463, 464, 467, 469, 468, 903; 315/80; 701/9, 47, 48, 70; 180/224
See application file for complete search history.

(56) References Cited

U.S. PATENT DOCUMENTS

| | | | |
|---|---|---|---|
| 3,576,527 A | | 4/1971 | Howard |
| 3,740,715 A | | 6/1973 | Szekessy |
| 3,875,559 A | * | 4/1975 | Szekessy ............... B60Q 1/444 340/464 |
| 6,720,871 B2 | * | 4/2004 | Boyer ..................... B60Q 1/444 340/463 |
| 6,943,677 B2 | | 9/2005 | Boyer et al. |
| 8,588,997 B2 | | 11/2013 | Pribula et al. |
| 2007/0241874 A1 | * | 10/2007 | Okpysh ................... B60Q 1/444 340/479 |
| 2010/0102946 A1 | * | 4/2010 | Polak ...................... B60Q 1/525 340/467 |
| 2012/0138395 A1 | * | 6/2012 | Curtis ....................... B60L 7/26 188/159 |
| 2013/0321143 A1 | * | 12/2013 | Boyer ....................... B60Q 1/44 340/463 |
| 2014/0361687 A1 | | 12/2014 | Olson et al. |

OTHER PUBLICATIONS

"Brake Attention Stop Light Taillight Module Flasher Rapid Flash 2 Steady on #SG8", [Online]. Retrieved from the Internet: <URL:http://www.ebay.com/itm/Brake-Attention-Stop-Light-Taillight-Module-Flasher-Rapid-Flash-2-Steady-On-SG8-/390782655134?hash=item5afc761a9e&vxp=mtr, (Accessed Sep. 14, 2015), 3 pgs.

\* cited by examiner

*Primary Examiner* — George Bugg
*Assistant Examiner* — Munear Akki
(74) *Attorney, Agent, or Firm* — Schwegman Lundberg & Woessner, P.A.

(57) ABSTRACT

An electrical apparatus can be used to modulate an apparent intensity of a vehicular braking indicator according to a specified pattern. When a duration of an initial brake application exceeds a specified initial modulation duration, the apparent intensity can continue to be modulated, but in a manner suppressing apparent variation in intensity until at least one of a release of brake application or until a specified timeout duration lapses. In an example, upon lapse of the timeout duration, modulation can be re-established to vary the apparent intensity of the vehicular braking indicator according to the specified pattern for another modulation duration corresponding to the initial modulation duration. The pattern can be customizable, such as provided to the electrical apparatus digitally, before installation. The customizability of the specified pattern can be inhibited, such as after installation by an installer or seller.

19 Claims, 6 Drawing Sheets

CUSTOMIZABLE MODULATOR FOR VEHICULAR BRAKING INDICATION

BACKGROUND

Distracted driving contributes significantly to vehicular accidents, and instances of distracted driving are increasing. Availability of technologies such as "smart" mobile phones including text messaging capability, or in-vehicle navigation systems or entertainment devices such as digital video or audio players can significantly contribute to such distraction, and such new technologies are likely to remain as persistent distractions. A distracted driver may have insufficient time to react or even perceive an approaching hazard, such as slow or stopped traffic ahead.

For decades, passenger and commercial vehicles such as cars and trucks have been equipped with tail-mounted brake indicator lights or "stop lamps." Generally, the tail-mounted light assemblies included two (or a multiple of two) light housings mounted symmetrically at the rear of the vehicle. The brake indicators are generally illuminated brightly and continuously in response to brake application by the driver of the vehicle. Control of such illumination is generally performed through actuation of a switch coupled to the brake applicator (e.g., a switch coupled to a brake pedal, brake pedal linkage, or other portion of the braking system). Upon application of the brake sufficient to actuate the switch, the brake indicators illuminate brightly and continuously until the brake application is released sufficiently to de-actuate the switch, such as when brake application is almost entirely or entirely released.

In the mid-1980's, a "third" brake indicator became required in the United States, to improve redundancy and to provide enhanced visibility of indication of braking action, such as in slow or stopped traffic where existing indicators may be obstructed. Generally, the third brake indicator was visible to the rear of the vehicle and mounted centrally and at a higher elevation on the vehicle than the existing symmetrically-mounted brake indicators. Such a third brake indicator is generally illuminated at the same time as the symmetrically-mounted brake indicators (e.g., continuously upon application of the brake). The third braking indicator can be referred to as a "center high mount stop lamp" (CHMSL).

OVERVIEW

A distracted driver may collide with slow or stopped vehicles due to failure to perceive such vehicles, or due to insufficient reaction time and stopping distance to avoid such collision even if the driver becomes aware of a hazard. For example, in rapidly stopping or stopped traffic, braking application for vehicles such as passenger vehicles or light trucks includes continuously illuminating braking indicators located on the rear of a vehicle. A distracted driver following such vehicles, such as approaching stopping, stopped, or slow-and-go traffic, may be less inclined to notice a "solid" braking indication or single change in braking indication (e.g., an initial application of brakes resulting in continuous braking indication).

By contrast, the present inventor has recognized, among other things, that modulation of the apparent intensity of a vehicular braking indicator according to a specified pattern can facilitate early recognition of a hazard by an approaching, trailing driver. Such modulation can "grab" the attention of the distracted driver, such as allowing earlier recognition of a potential hazard.

The modulation apparatus can include an electronic apparatus, such as can be included in a new vehicle or trailer (such as installed or integrated by the original equipment manufacturer (OEM)), or retrofit in an existing vehicle or trailer (e.g., in the aftermarket, or as a dealer-installed option, as illustrative examples). For example, the electronic apparatus can be spliced or otherwise conductively coupled in-line with conductors feeding one or more rear-facing vehicular braking indicators, such as a center high-mount stop lamp (CHMSL) or trailer brake light assembly. In another example, the modulation apparatus can be included as a portion of a complete lamp assembly for mounting on or within a vehicle or trailer. In yet another example, the modulation apparatus can be included as a portion of a brake indicator control module integrated with a new vehicle, such as during production of the new vehicle by the OEM.

The electronic apparatus can include a mechanical or electronic switch that one of interrupts or shunts a braking indication illumination signal to the one or more braking indicators, such as modulating a current or voltage delivered to the braking indicator. Various parameters relating to the modulation can be customized, such as to provide a "vanity" or "signature" flashing sequence signaling an installation corresponding to a particular vendor, dealership, or vehicle manufacturer. An end user of the modulation apparatus, such as an owner or operator of the vehicle or trailer equipped with the modulation apparatus, can be inhibited from modifying the customizable pattern.

By contrast with other approaches, during continued brake application, the modulation of apparent intensity according to the specified pattern can be terminated after a specified initial modulation duration, to suppress apparent variation in intensity, but while still continuing to modulate a current or voltage to the braking indicator in a manner that is not apparent to others viewing the braking indicator (e.g., using modulation having a pulse width short enough or using pulse amplitude variation small enough that such amplitude variation that such pulse width variation or pulse amplitude variation is not perceived as blinking or flashing).

Such non-apparent modulation can continue until the brake is released or, for example, until a specified duration expires and the apparent (e.g., highly-visible) specified pattern can again be repeated. In an example, if the brake is released, modulation is terminated. A timer can be initiated upon detection of a release of the brake. If the brake is re-applied within a specified duration as indicated by the timer, the electronic apparatus can enter the non-apparent modulation state without presenting the apparent modulation pattern. This can avoid frequent distracting apparent flashing when the brake is momentarily released and quickly re-applied, such as in stop-and-go traffic. In this manner, a "lockout" scheme is not needed and a control circuit supervising the modulation provides modulation in all states when the brake is applied, but, depending on the state of the electronic apparatus, the modulation may not always be visibly apparent to observers.

In an example, an electrical apparatus can include a power supply circuit configured to obtain operating energy from a vehicular braking indicator conductor coupled to the power supply circuit. The electrical apparatus can include a control circuit coupled to the power supply circuit, the control circuit configured to operate using energy provided by the power supply circuit obtained from the vehicular braking indicator conductor, and a switching circuit coupled to the control circuit and coupleable to the vehicular braking indicator conductor, the switching circuit configured to modulate an electrical signal of the vehicular braking conductor to provide a modulated vehicular braking indicator output coupleable to a vehicular braking indicator. The vehicular braking indicator conductor can include a signal conductor routed to a center high-mount stop light (CHMSL), for example, such as CHMSL housing one or more light emitting diodes or incandescent lamps. In another example, the vehicular braking indicator conductor can include a signal conductor routed to one or more of an automobile or truck tail light, or a lamp assembly located on a trailer or other towable vehicle.

The control circuit can be configured to control the switching circuit to provide the modulated vehicular braking indicator output including, upon receiving the electrical signal of the vehicular braking indicator indicative of an initial brake application, modulating one or more of an output current or voltage provided to the modulated vehicular braking indicator output to vary the apparent intensity of the vehicular braking indicator according to a specified pattern during an initial modulation duration, monitoring a duration of the initial brake application; and, in response, when the duration of the initial brake application exceeds the initial modulation duration, continuing to modulate one or more of the output current or voltage in a manner suppressing apparent variation in intensity until at least one of a release of brake application indicated by the electrical signal of the vehicular braking indicator or until a specified timeout duration lapses.

This overview is intended to provide an overview of subject matter of the present patent application. It is not intended to provide an exclusive or exhaustive explanation of the invention. The detailed description is included to provide further information about the present patent application.

Figure 1:
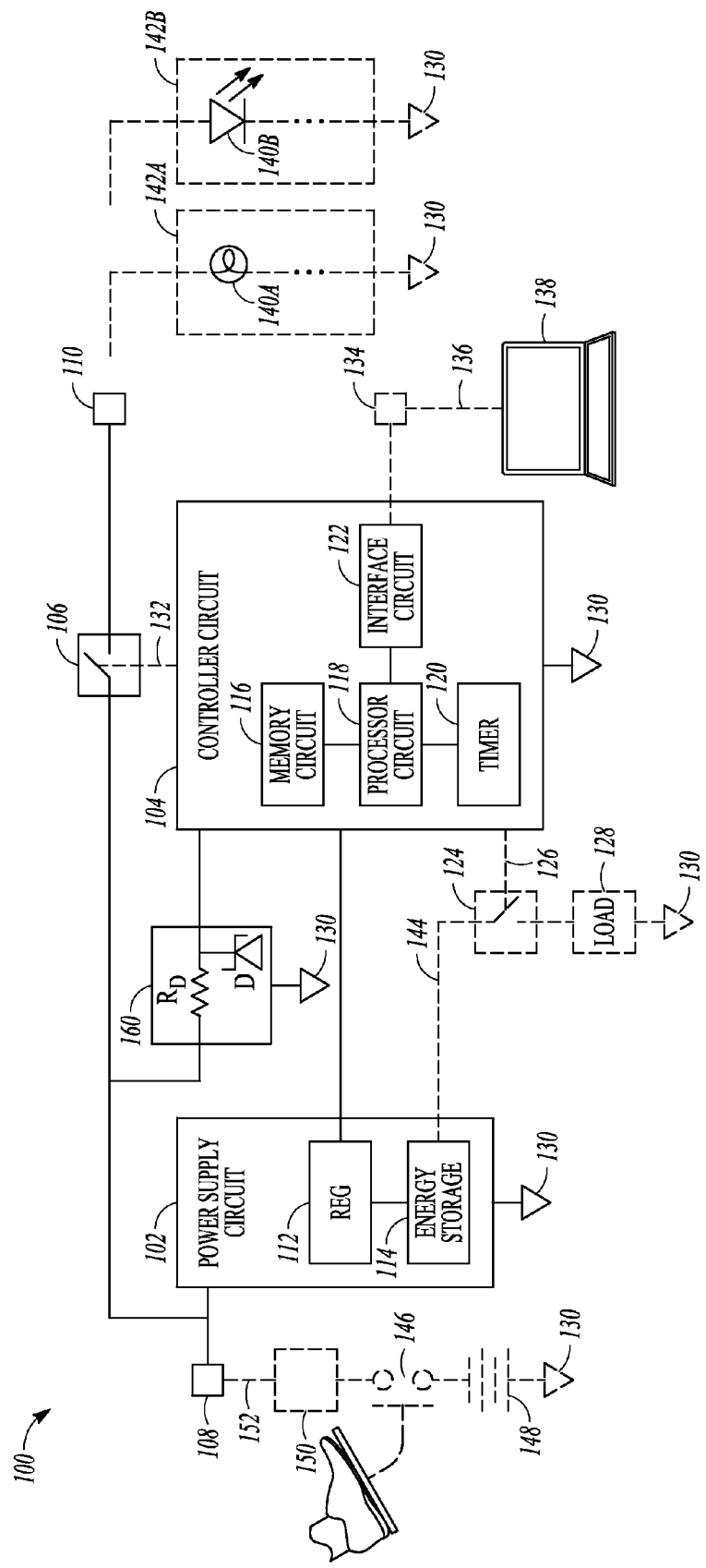
FIG. 1 illustrates generally an electronic apparatus, such as can be used to modulate a signal for a vehicular braking indicator.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1 illustrates generally an electronic apparatus 100, such as can be used to modulate a signal for a vehicular braking indicator, such as can include one or more of an indicator 142A (e.g., including an incandescent lamp 140A) or an indicator 142B (including a light emitting diode (LED) 140B). The electronic apparatus of FIG. 1 can be used to provide operation according to one or more of the signal timings shown in FIG. 2A, FIG. 2B, or FIG. 2C, or to perform a technique, such as a method, as shown illustratively in one or more of FIG. 3, FIG. 4, or FIG. 5.

The electronic apparatus 100 can include an input terminal 108, such as can be coupled to a vehicular braking indicator conductor 152. For example, the electronic apparatus 100 can be spliced or attached in-line with a wiring loom or harness including the vehicular braking indicator conductor 152, such as in a series configuration to modulate a voltage or current flowing through the vehicular braking indicator conductor 152 using a switching circuit 106 located between the input terminal 108 and an output terminal 110. In another example, the electronic apparatus 100 can be spliced or attached to the vehicular braking indicator conductor 152 to provide a controllable shunt to provide a bypass current path in parallel with a current path including one or more of vehicular braking indicator 142A or 142B, such as between the input terminal 108 and a return node 130 (e.g., a "ground" or chassis return node, such as conductively coupled to a negative polarity terminal of a battery or other portion of a vehicular electrical system). Such a bypass path can have a controllable impedance to vary a shunt current, thereby modulating a current through the braking indicator 142A or 142B by diverting current away from the braking indicator 142A or 142B.

In yet another example, the electronic apparatus 100 can be integrated with the electronics and wiring of a new vehicle, such as during manufacturing. In yet another example, a complete lamp assembly can include the electronic apparatus 100 along with one or more braking indicators, such as the braking indicators 142A or 142B. For example, the lamp assembly can include one or more of a printed circuit board assembly, housing, one or more lamps, and one or more lenses. Such a lamp assembly can be installed on or within a vehicle, such as at the time of the manufacturing or as an after-market or custom option. For example, a lamp assembly can be installed or integrated with a trailer or other towed vehicle.

In an illustrative example, one or more of the input terminal 108, output terminal 110, or return node 130 can be coupled to a vehicular electrical system such as using one or more of pluggable connectors, in-line connectors such as crimp connectors, insulation displacement connectors, insulated splice joints, or other electrical interconnects. Examples can include a configuration for retrofit in existing vehicles using an existing lamp assembly or a configuration comprising self-contained or stand-alone lamp assembly, or the electrical apparatus can be integrated with the electronics in a new vehicle, such as included as a function or portion of an electronic module in a new vehicle.

In an example, the electrical apparatus 100 can be compact, such as comprising a printed circuit board assembly including a power supply circuit 102, a controller circuit 104, and the switching circuit 106. Such an assembly can be encapsulated or conformally coated. In an example, the electrical apparatus 100 can be included as a portion of another vehicular electronic module or assembly, such as if the electrical apparatus 100 is integrated with vehicular electronics by the OEM.

The power supply circuit 102 can include one or more of a regulator circuit 112 and an energy storage device 114. For example, the regulator circuit 112 can include a three-terminal regulator integrated circuit such as can adapt an input voltage or current to one or more specified output voltages, such as to provide power for the controller circuit 104 or other portions of the electronic apparatus 100. The energy storage device 114 can include one or more of a capacitor, super capacitor, or battery, for example. The energy storage device 114 can be used to provide energy residually, such as for a short duration after release of the brake and suppression of a vehicular braking indication signal on the conductor 152.

The power supply circuit 102 can obtain operating energy from a vehicular braking signal provided at the input terminal 108. For example, a vehicular electrical system can include a storage battery 148 (e.g., a lead-acid battery to provide power to energize a starter for an internal combustion engine and to provide a field excitation voltage for an alternator or generator). The storage battery 148 can be coupled to a switch 146, such as a switch coupled to a brake pedal, a brake pedal linkage, or another portion of a vehicular braking system. Upon brake application, the switch 146 can be closed and can provide a vehicular braking indication signal, such as directly to the vehicular braking indicator conductor 152, or to an electronic braking control module 150. For example, the electronic braking module 150 can generate or route vehicular braking indication signals to vehicular braking indicators, such as using one or more vehicular braking indication conductor 152. The vehicular braking indication signal generally includes a signal sufficient to cause one or more braking indicators 142A or 142B to illuminate. Accordingly, the vehicular braking indicator signal generally includes sufficient power to energize the electronic apparatus 100.

The controller circuit 104 of the electronic apparatus can include one or more of a processor circuit 118 and a memory circuit 116. The processor circuit 118 and memory circuit 116 can be arranged to execute instructions such as to provide control of modulation of the vehicular braking indicator signal using the switching circuit 106. For example, such modulation control can include instantiation of one or more state machines, timers, or counters. A hardware timer 120 can also be included, such as to provide a watchdog or other timer independent of the processor circuit 118. In an example, a hardware oscillator can be coupled to a watchdog timer, such as to one or more of reset or shut down the processor circuit 118, to suppress modulation in the event of a fault, or in response to a specified duration elapsing with no vehicular braking indication signal.

In an example, the controller circuit 104 can include a "kill switch" control output 126, such as coupled to a "kill switch" 124 (e.g., a transistor). The "kill switch" can be coupled to the return node 130, such as via a dissipative load 128 (e.g., another transistor configured to provide a load, or a passive device such as a resistor). When energized, the "kill switch" 124 can discharge an energy storage device, such as the energy storage device 114. When the energy storage device is sufficiently discharged, operation of the control circuit 104 can cease. A future braking indication signal can re-energize the power supply circuit 102, and the controller circuit 104 can thereby be restarted in a known state (such as a reset state).

The controller circuit 104 can include or can be coupled to an interface circuit 122, such as to provide a port 134 for programming of the controller circuit 104. In an example, the interface circuit 122 can include one or more of a Universal Serial Bus (USB) port, an RS-232 or RS-422 port, a 1WIRE interface, an I$^2$C (inter-integrated circuit) interface, a serial peripheral interface (SPI), a Joint Test Action Group (JTAG) interface, an In Circuit Serial Programming (ICSP) interface, controller area network (CAN) bus, or other interface. The 134 can be coupled to a programming device 138 via a cable 136. The programming device can include a separate controller assembly, a laptop or other portable computing device, or other hardware. In an example, the interface circuit 122 can be used, such as to provide customization of a specified modulation pattern or other parameters for use in modulation of the vehicular braking indicators 142A or 142B.

For example, a duration of pulses, an inter-pulse interval, or an interval between groups of visibly apparent pulses can be configured using the interface circuit 122, such as can include downloading replacement firmware to a non-volatile portion of the memory circuit 116. In another example, the interface circuit 122 can be used to update one or more registers or other data structures in the non-volatile portion of the memory circuit 116. Access to the interface circuit can be inhibited after initial programming, such as by physically removing a portion of the interface circuit 122 or interface port 134, or by rendering the interface circuit 122 or interface port 134 inoperable, such as by burning a fusible structure or setting a register value or establishing other data in the memory circuit 116 to inhibit further programming. For example, a particular vendor (e.g., a dealership or distributor) or manufacturer can establish a customizable modulation pattern that can be unique to the particular vendor or manufacturer (or even unique to a particular make or model of vehicle).

The processor circuit 118, memory circuit 116, interface circuit 122 and switch control outputs such as an output 132 or the output 126 need not be provided by physically separate integrated circuits. For example, the processor circuit 118, memory circuit 116, interface circuit 122, and digital outputs can be co-integrated within a commonly-shared integrated circuit package, such as a microcontroller, or system-on-chip. In another example, the processor circuit 118, memory circuit 116, and interface circuit 122 can be co-integrated or coupled to other vehicular electronics, such as integrated with vehicular electronics in relation to manufacturing a new vehicle. Such integration with a new vehicle can be referred to as original equipment manufacturer (OEM) integration. In an OEM-integrated example, the electronic apparatus 100 can be powered by an electrical circuit hard-wired to a vehicle accessory power bus, such as instead of scavenging energy from a braking indicator output.

In an illustrative example, the power supply circuit 102 can include a regulator circuit configured to provide 5.7 volts (V) to a capacitor via a blocking diode. The diode establishes a voltage drop of about 0.7V, resulting in a 5V supply for the controller circuit when the power supply circuit is provided with about 12 to 14V at the input port 108. In an illustrative example, the output 132 can be coupled to one or more metal-oxide-semiconductor field effect transistors (MOSFETs) to provide the switch 106. For example, an N-channel FET can be used to drive the gate of a P-channel FET, where the vehicular braking indicator signal is modulated by the P-channel FET under the control of the N-channel FET. A gate of the N-channel FET can be a general-purpose digital output (e.g., the output 132) from a microcontroller included as a portion of the controller circuit 104. Sensing of one or more of brake application, release, or re-application can be performed by monitoring a voltage present on the vehicular braking indicator conductor 152, such as using a detector circuit 160 that can include diode clamp circuit, D, and resistor, RD, such as coupled to a general-purpose digital input of the controller circuit 104. In another example, detection can be performed using one or more of a resistor divider configuration or amplifier, such as coupled to an analog-to-digital converter (ADC) or general-purpose ADC input of a microcontroller.

Figure 2A:
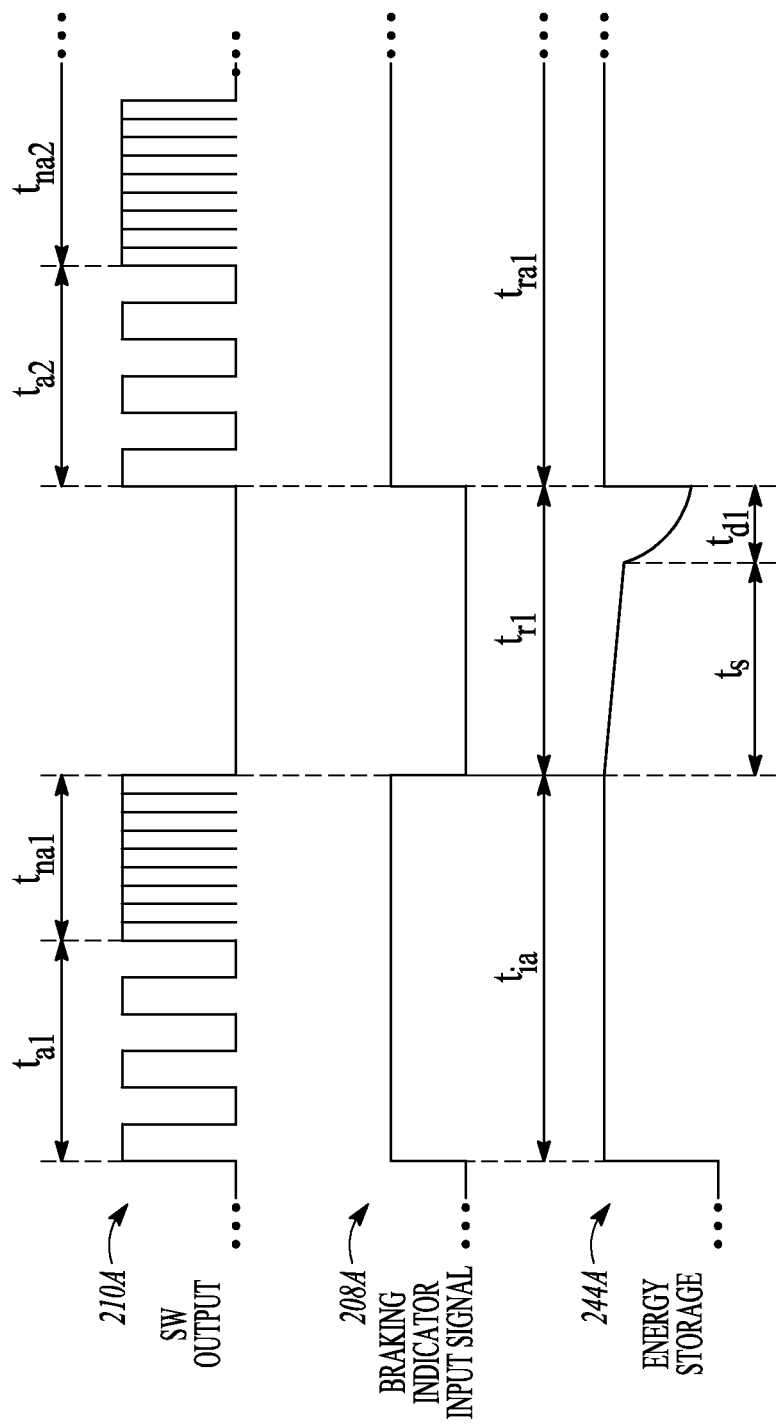
FIG. 2A illustrates generally an illustrative example of signal timings, such as corresponding to a first example where a delay before brake reapplication is longer than a specified sleep duration, and where braking application continues over a duration sufficient to trigger modulating the vehicular braking indicator output to again vary the apparent intensity of the vehicular braking indicator.

FIG. 2A illustrates generally an illustrative example of signal timings, such as corresponding to a first example where a delay before brake reapplication (e.g., $t_{r1}$) is longer than a specified sleep duration (e.g., $t_s$), and where braking application continues over a duration sufficient to trigger modulating the vehicular braking indicator output to again vary the apparent intensity of the vehicular braking indicator. A plot 208A illustrates generally a representation of the sensed braking indicator input signal, showing an initial brake application duration (e.g., $t_{ia}$), followed by an interval (e.g., $t_{r1}$) where the brake is released, and then a re-application duration (e.g., $t_{ra1}$) where the brake is re-applied. The plot 210A illustrates generally a figurative (e.g., not to scale) representation of a switch control output showing various states. Upon detection of an initial application of the brake, a vehicular braking indicator signal can include a first apparent modulation duration (e.g., $t_{a1}$) where an intensity of the vehicular braking indicator is varied according to a specified pattern in a manner apparent to an observer (such as causing visible pulsing or flashing). After the first apparent modulation duration $t_{a1}$, modulation can continue, but in a non-apparent manner, for a non-apparent modulation duration (e.g., $t_{na1}$). The non-apparent modulation duration $t_{na1}$ can be terminated such as by release of the brake as indicated by the beginning of the duration $t_{r1}$ on the braking indicator input signal plot 208A. A plot 244A shows a signal representative of the energy storage device (such as corresponding to a plot of the voltage stored on a bulk capacitor included as a portion of the electronic apparatus 100 of FIG. 1).

Upon initial application of the brake at the beginning of the duration $t_{ia}$ as indicated on plot 208A, the energy storage device can be rapidly charged and operating energy can be provided for use in modulating a braking indication signal. Upon release of the brake as indicated by the end of the duration $t_{ia}$, the electronic apparatus can entering a polling sleep state, such as for a specified sleep duration (e.g., $t_s$). During the polling sleep state, the electronic apparatus can cycle between a generally-inactive or quiescent mode, such as having a duration of a millisecond or more, and then the electronic apparatus can poll an input, such as coupled to a braking indication detector 160 as shown in FIG. 1. After polling the input and determining that the brake has not been re-applied, the electronic apparatus can re-enter the generally-inactive or quiescent mode. Accordingly, during the sleep duration $t_s$, the electronic apparatus need not be entirely inactive, and the electronic apparatus can periodically poll or otherwise poll for brake re-application.

Upon lapse of the specified sleep duration, the electronic apparatus can exit the polling sleep state and enter a rapid-discharge mode during the discharge interval (e.g., tai) such as to dissipate residual energy in the energy storage device (e.g., using the "kill switch") mentioned above. If power is re-applied as indicated by the beginning of the re-application duration $t_{ra1}$, the energy storage device can rapidly re-charge and the brakes can be modulated in a visibly apparent manner as shown by a second apparent modulation duration (e.g., $t_{a2}$), and a second non-apparent modulation duration (e.g., $t_{na2}$). Modulation can be entirely suppressed during the sleep duration $t_s$, and during the discharge interval $t_{d1}$. In an illustrative example, the apparent modulation durations $t_{a1}$ and $t_{a2}$ can be about 1.5 seconds each, including three pulses where each pulse has an "on" duration that is similar to the "off" duration, and the sleep duration $t_s$ can be about 5 seconds. Generally, if the sleep duration $t_s$ lapses before re-application of the brake, then visibly apparent modulation is re-triggered upon re-application of the brake (as also shown illustratively in FIG. 2C). In an illustrative example, for every 2 milliseconds of duration during the non-apparent modulation duration there can be a 30 nanosecond "off" duration. Accordingly, even though modulation of the vehicular braking indicator is continuing during the duration $t_{na1}$, such modulation is not apparent to an observer viewing the braking indicator. This avoids any need for a "lockout" of the modulation during braking application, while still providing at least two distinct states during braking application (e.g., visibly apparent modulation such as during the interval $t_{a1}$, and non-visibly-apparent modulation such as during the interval $t_{na1}$).

Figure 2B:
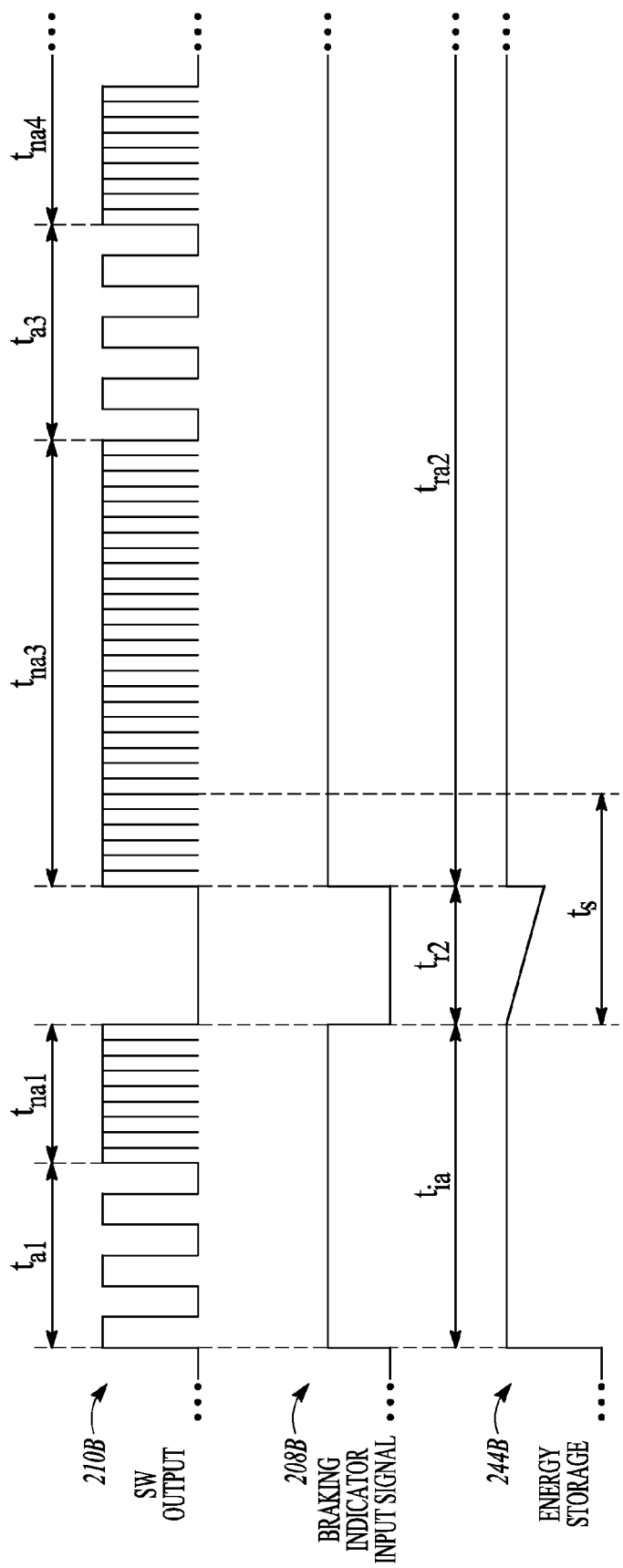
FIG. 2B illustrates generally an illustrative example of signal timings, such as corresponding to a second example where a delay before brake reapplication is shorter than the specified sleep duration.

FIG. 2B illustrates generally an illustrative example of signal timings, such as corresponding to a second example where a delay before brake reapplication (e.g., $t_{r2}$) is shorter than the specified sleep duration ($t_s$). In FIG. 2B, a plot 210B of the switch control output is shown, aligned with a plot 208B of a braking indicator input signal representation, and a plot 244A of a signal representative of the energy storage device. As in FIG. 2A, during an initial application duration (e.g., $t_{ia}$), the switch output will cycle through states including an apparent modulation duration (e.g., $t_{a1}$) and, if $t_{ia}$ is sufficiently long in duration, the switch output will enter a non-apparent modulation state as indicated by the first non-apparent modulation duration (e.g., $t_{na1}$). To an observer of the braking indicator, such a sequence of states can appear as a first mode including flashing or varying in intensity of the indicator (e.g., during $t_{a1}$) followed by a duration (e.g., during $t_{na1}$) where the braking indicator is seemingly solidly illuminated (e.g., flashing is not visibly apparent but modulation is still occurring).

Upon release of the brake, indicated by the beginning of the release interval (e.g., $t_{r2}$), modulation can be suppressed and the electronic apparatus can enter a sleep state as indicated by the beginning of the sleep duration (e.g., $t_s$). By contrast with the example of FIG. 2A, the sleep duration $t_s$ does not lapse before re-application of the brake at the end of the brake release interval $t_{r2}$. Because the sleep duration $t_s$ has not lapsed, the switch output can modulate the braking indication signal in a manner that is not visually apparent as indicated by the non-apparent modulation duration (e.g., $t_{na3}$) aligned with a brake re-application duration (e.g., $t_{r2}$), and visibly apparent modulation can be suppressed. This corresponds to an example where the brake is quickly re-applied after a brief release, such as in stop-and-go or slow-and-go traffic. In this manner, visibly apparent flashing is suppressed upon re-application of the brake at the beginning of the re-application duration $t_{ra2}$.

If the re-application duration $t_{ra2}$ is sufficiently long in duration, then another apparent modulation duration (e.g., $t_{a3}$) can be triggered following the duration $t_{na3}$ to again visibly modulate (e.g., flash) the braking indicator. After the apparent modulation duration ta3, another non-apparent modulation duration (e.g., tna4) can be initiated such as until the brake is released. If the brake is applied continuously throughout the duration $t_{na4}$ and beyond, further apparent modulation durations can be triggered at specified intervals. According to an illustrative example, the duration $t_{na3}$ before visibly apparent modulation can be about 5 seconds, and such visibly apparent modulation can be re-triggered at specified intervals of 5 seconds during continuous braking application.

Figure 2C:
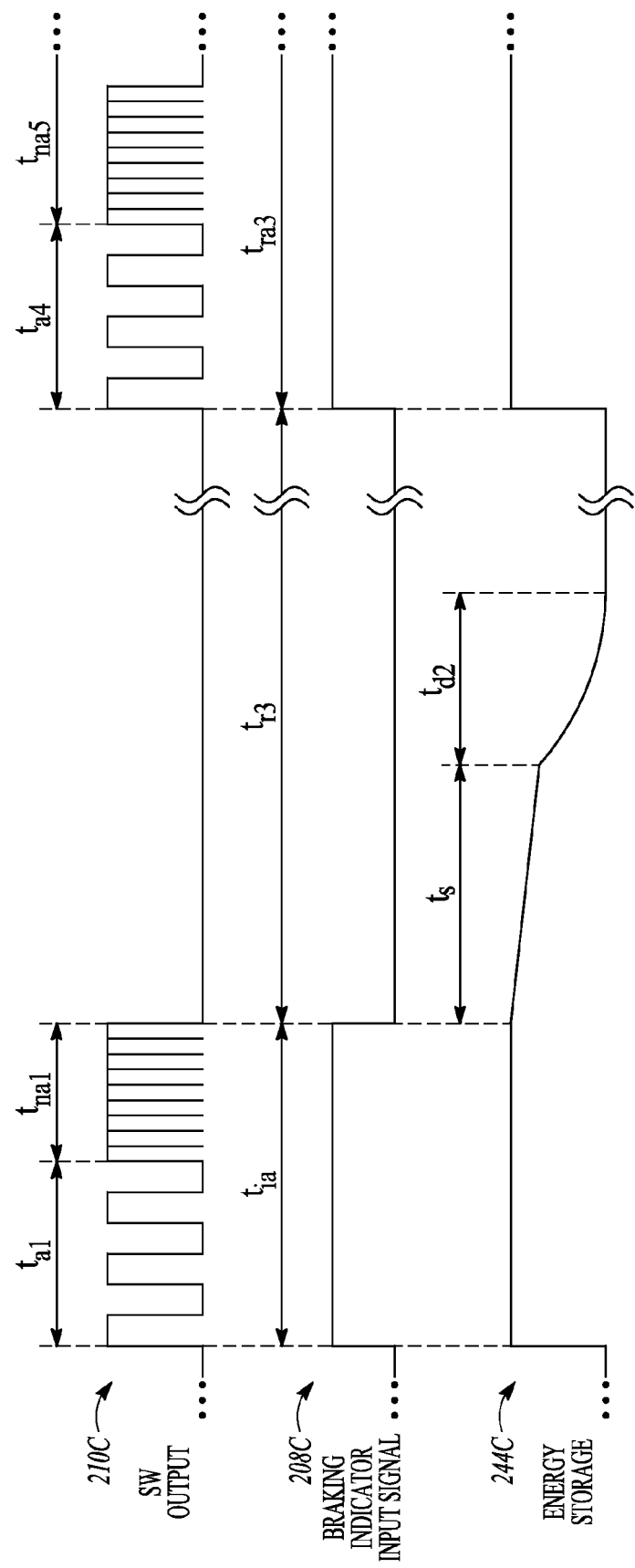
FIG. 2C illustrates generally an illustrative example of signal timings, such as corresponding to a third example where a delay before brake reapplication is significantly longer than the specified sleep duration.

FIG. 2C illustrates generally an illustrative example of signal timings, such as corresponding to a third example where an interval (e.g., $t_{r3}$) before brake re-application is significantly longer than the specified sleep duration ts. As in the examples of FIG. 2A and FIG. 2B, in FIG. 2C, a plot 210C of the switch control output is shown, aligned with a plot 208C of a braking indicator input signal representation, and a plot 244C of a signal representative of the energy storage device. During an initial brake application duration (e.g., $t_{ia}$) as indicated by the braking indicator input signal plot 208C, an apparent modulation duration (e.g., $t_{a1}$) and a non-apparent modulation duration (e.g., $t_{na1}$) are shown, provided at the switch control output according to the plot 210C. A braking release interval (e.g., $t_{r3}$) can be sufficiently long in duration such that a sleep duration ts expires, and a discharge is initiated as shown by the discharge duration $t_{d2}$. Upon completion of the discharge of the energy storage device as shown in the plot 244C at the end of $t_{d2}$, the electronic apparatus comprising the braking indicator modulator can be dormant (e.g., powered down in an off-state). A brake re-application some time in future (e.g., second or minutes later), such as $t_{ra3}$, can again power up the braking indicator modulator, such as in a "cold start" configuration state or other specified initial state, and operation can occur as in other examples where an apparent modulation state can be triggered (e.g., during duration $t_{a4}$), followed by a non-apparent modulation state (e.g., during duration $t_{na5}$).

The patterns shown illustratively in plots 210A, 210B, and 210C of FIG. 2A, FIG. 2B, and FIG. 2C are generally rectangular including three pulses having an on duration similar to an off duration between pulses, however patterns can be used where a series of incremental amplitude steps are provided, such as to gradually fade up or fade down in apparent intensity. Other pulse timing parameters such as number of pulses, inter-pulse interval, "on" duration, "off" or "dim" duration, or fade duration, can be adjustable. Fading can be implemented such as by varying a control signal provided to a transistor such as to modulate one or more of a voltage or current to an intermediate level between a full-scale (e.g., saturated) magnitude and a cut-off condition. Such a control signal can be provided such as using a general-purpose digital-to-analog converter (DAC) output provided by a microcontroller, as an illustrative example. In another example, an apparent intensity of a braking indication can be faded up or down using pulse width modulation (PWM), such as by sweeping one or more pulse parameters through a range of values. In this manner, an output amplitude of the "on" state can be fixed, but the apparent intensity of a braking indicator output can still be varied.

As mentioned elsewhere herein, the specified pattern can be customized, such as to signal a particular source or vendor. For example, a certain specified sequence of pulses can indicate a particular vendor, manufacturer, or installer. The patterns shown illustratively in plots 210A, 210B, and 210C of FIG. 2A, FIG. 2B, and FIG. 2C can be established using instructions stored in a memory circuit, where the instructions can be performed by one or more processor circuits. In addition or instead, the patterns can be implemented using one or more state machines or other logic, such as using a field-programmable gate array (FPGA) or other programmable logic device (PLD).

Figure 3:
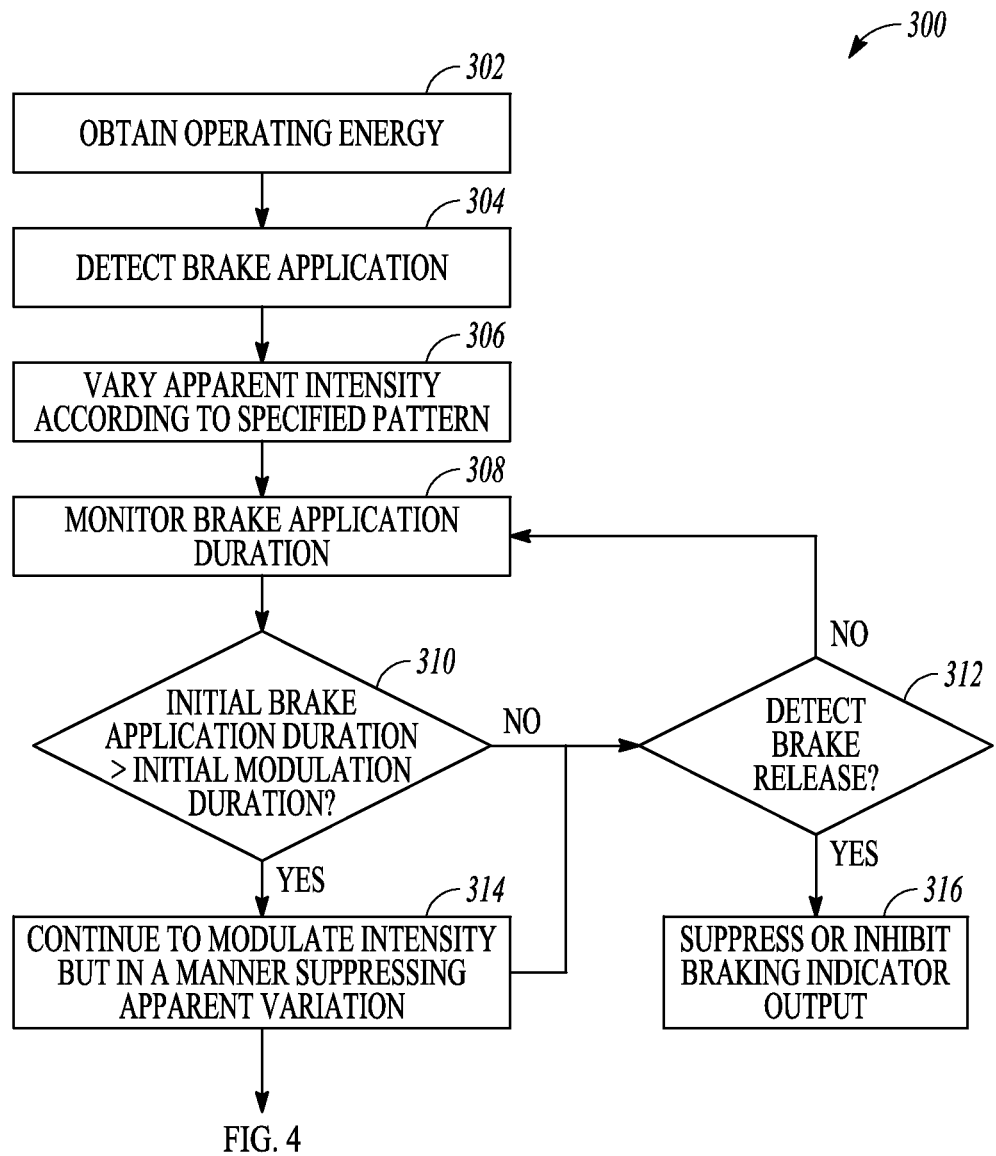
FIG. 3 illustrates generally a technique, such as a method, that can include obtaining operating energy from a conductor of a vehicular braking indicator circuit, and modulating a vehicular braking indicator output using the obtained energy.

FIG. 3 illustrates generally a technique 300, such as a method, that can include obtaining operating energy from a conductor of a vehicular braking indicator circuit, and modulating a vehicular braking indicator output using the obtained energy, such as using electronic apparatus as shown and described in other examples, such as in relation to FIG. 1. At 302, operating energy can be obtained (e.g., scavenged) from the braking indicator signal. Such a signal is generally used to provide energy to illuminate one or more braking indicators. As shown and described in other examples, such a braking indicator signal can be used as an input to provide operating energy for a braking indicator modulator circuit. At 304, brake application can be detected, such as using a presence of the braking indicator input signal as indicative of brake application. Such detection can be performed such as storing a small amount of retained energy sufficient to power a processor circuit (e.g., a microcontroller) and brake application detection circuitry, such as to continue providing power for the braking indicator modulator circuit to maintain a specified state (e.g., a sleep state) when the brake is momentarily released and re-applied.

At 306, an apparent intensity of a braking indicator can be modulated, such as by modulating one or more of a voltage or current provided to the braking indicator, to provide a specified modulation pattern. For example, the apparent intensity of the braking indicator can be gated or modulated using a semiconductor device such as a transistor in series with the braking indicator signal to vary a series impedance in a controlled manner. At 308, a brake application duration can be monitored such as using one or more of a hardware or software-implemented timer. If the initial application duration of braking exceeds an initial apparent modulation duration, then at 314 modulation can continue, but in a manner suppressing apparent variation in intensity. For example, this can appear to observer as a "solid" braking indicator without apparent flashing, even though modulation is still performed. At 312, if the brake has not been released, brake application can continue to be monitored at 308. At 316, if the brake has been released then the braking indicator output can be suppressed or inhibited.

Figure 4:
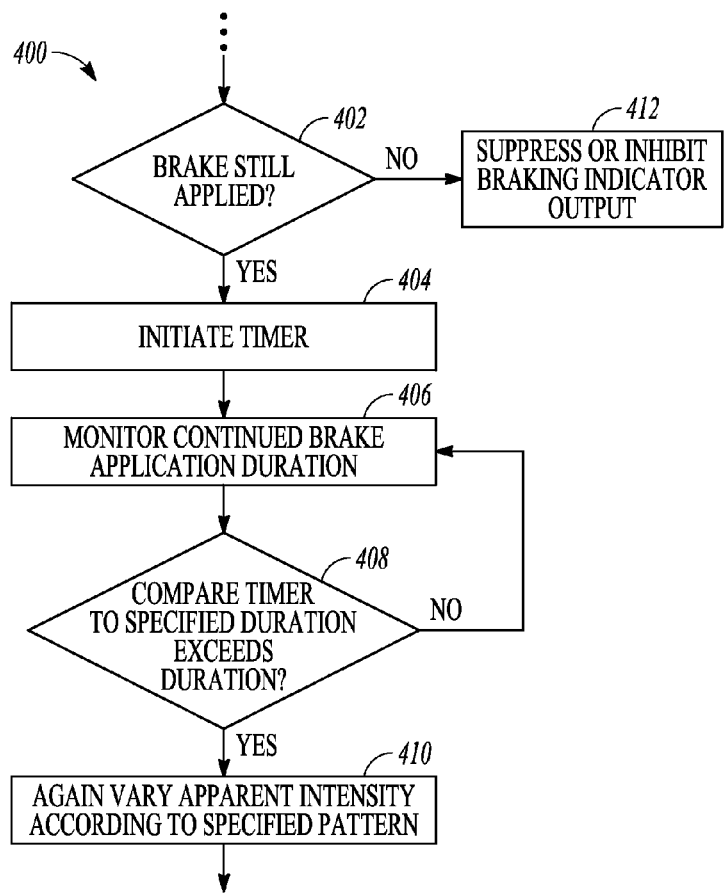
FIG. 4. illustrates generally a portion of a technique, such as a method, such as can be used in combination with the technique of FIG. 3, such as can include re-establishing the modulating the vehicular braking indicator output to again vary the apparent intensity of the vehicular braking indicator.

FIG. 4. illustrates generally a portion of a technique 400, such as a method, such as can be used in combination with the technique of FIG. 3, such as can include re-establishing the modulating the vehicular braking indicator output to again vary the apparent intensity of the vehicular braking indicator, such as using electronic apparatus as shown and described in other examples, such as in relation to FIG. 1. At 402, if the brake is continuously applied, such as detected by monitoring a braking indicator signal, a timer can be initiated. Monitoring can continue at 406, and at 408 if the timer indicates a value exceeding a specified duration, at 410 the apparent intensity of the braking indicator can again be modulated in a manner apparent to a user. This corresponds to a series of state transitions where a brake is applied, and initial apparent modulation (e.g., flashing) occurs, then after a specified initial duration, modulation that is not apparent is provided (e.g., flashing not apparent to user), and, if braking continues, apparent modulation can be re-established (e.g., "re-flashing") in response to continued braking. At 412, if the brake is not still applied, the braking indicator output can be suppressed or inhibited.

Figure 5:
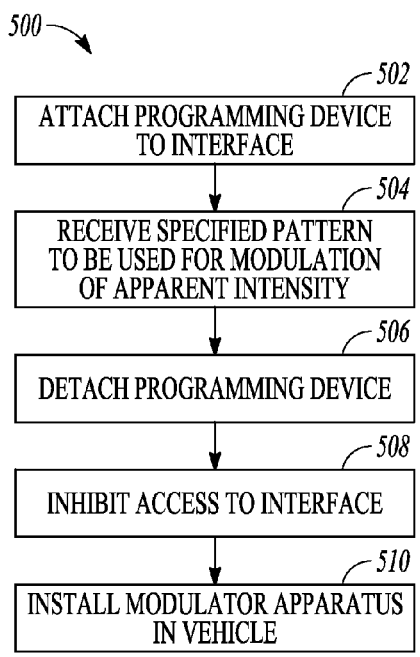
FIG. 5 illustrates generally a technique, such as a method, that can include customizing a specified pattern to be used for modulation of apparent intensity of a vehicular braking indicator.

FIG. 5 illustrates generally a technique 500, such as a method, that can include customizing a specified pattern to be used for modulation of apparent intensity of a vehicular braking indicator. At 502, a programming device such as a laptop or handheld device (e.g., a smart phone or application-specific programming tool) can be attached to an interface included as a portion of a vehicular braking indicator modulator circuit. At 504, a specified pattern to be used for modulation of apparent intensity can be received, such as including various parameters to be stored by the vehicular braking indicator modulator circuit. At 506, the programming device can be detached. At 508, access to the interface can be inhibited. For example, access can be inhibited by encapsulating or housing the modulator circuit in a manner precluding physical access to individual pins or conductors comprising a hardware interface. In another example, a software-implemented lock can be imposed (e.g., by disabling the interface via encoding replacement code or firmware in a non-volatile memory included as a portion of the modulator circuit). In yet another example, a fuse can be burned or otherwise altered to inhibit use of the interface after customization.

In yet another example, a jumper or other component (e.g., a zero-ohm resistor) can be removed or populated to inhibit use of the interface. For example, after programming a jumper or zero-ohm resistor can be placed on a pin or other location such as to logically disable the interface. In this manner, a customized specified pattern can be fixed in the braking modulator circuit, such as to identify a particular source (e.g., a particular vendor, seller, manufacturer, or make or model of vehicle).

Various Notes & Examples

Each of the non-limiting examples described in this document can stand on its own, or can be combined in various permutations or combinations with one or more of the other examples. The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:
1. An electrical apparatus, comprising:
a power supply circuit configured to obtain operating energy from a vehicular braking indicator conductor coupled to the power supply circuit;
a control circuit coupled to the power supply circuit, the control circuit configured to operate using energy provided by the power supply circuit obtained from the vehicular braking indicator conductor;
a switching circuit coupled to the control circuit and coupleable to the vehicular braking indicator conductor, the switching circuit configured to modulate an electrical signal of the vehicular braking conductor to provide a modulated vehicular braking indicator output coupleable to a vehicular braking indicator;
wherein the control circuit is configured to control the switching circuit to provide the modulated vehicular braking indicator output including:
upon receiving the electrical signal of the vehicular braking indicator indicative of an initial brake application, modulating one or more of an output current or voltage provided to the modulated vehicular braking indicator output to vary the apparent intensity of the vehicular braking indicator according to a specified pattern during an initial modulation duration;
monitoring a duration of the initial brake application; and
in response, when the duration of the initial brake application exceeds the initial modulation duration, continuing to modulate one or more of the output current or voltage in a manner suppressing apparent variation in intensity until at least one of a release of brake application indicated by the electrical signal of the vehicular braking indicator or until a specified timeout duration lapses;

in response to monitoring the duration of the initial brake application indicative of continued brake application, and upon lapse of the timeout duration, re-establishing the modulating one or more of an output current or voltage provided to the modulated vehicular braking indicator output to vary the apparent intensity of the vehicular braking indicator according to the specified pattern for another modulation duration corresponding to the initial modulation duration;

initiating a timer upon release of brake application as indicated by monitoring the initial brake application;

detecting re-application of the brake indicated by the electrical signal of the vehicular braking indicator;

comparing a duration, indicated by the timer, between the release of brake application and an instant of re-application of the brake, to a specified threshold duration; and in response, when the duration between release and re-application of the brake indicated by the electrical signal of the vehicular braking indicator is less than the specified threshold duration, modulating one or more of the output current or voltage in a manner suppressing apparent variation in intensity until at least one of a release of brake application indicated by the electrical signal of the vehicular braking indicator or until the timeout duration lapses.

2. The electrical apparatus of claim 1, wherein the control circuit is configured to control the power supply circuit including:

monitoring the electrical signal of the vehicular braking indicator;

comparing a duration, indicated by the timer, to a specified sleep duration in an absence of re-application of the brake as indicated by the monitoring of the electrical signal of the vehicular braking indicator; and dissipating residual energy from an energy storage device when the comparison indicates a duration exceeding the specified sleep duration absent re-application of the brake, to establish a specified initial state of the electrical apparatus by shutting down the electrical apparatus using the dissipating.

3. The electrical apparatus of claim 1, comprising:
a housing including the control circuit and the switching circuit; and
an electrical interconnect configured to conductively couple the vehicular braking indicator conductor to the electrical apparatus.

4. The electrical apparatus of claim 1, wherein the switching circuit is located in a series configuration between the modulated vehicular braking indicator output and the vehicular braking indicator conductor to provide the modulated vehicular braking indicator output by modulating a series impedance.

5. The electrical apparatus of claim 1, wherein the switching circuit is located in a shunt configuration between the modulated vehicular braking indicator output and a reference potential to provide the modulated vehicular braking indicator output by modulating a shunt impedance to divert a current coupled through the modulated vehicular braking indicator output.

6. The electrical apparatus of claim 1, wherein the switch comprises a semiconductor switch.

7. The electrical apparatus of claim 6, wherein the semiconductor switch includes a field effect transistor (FET).

8. An electrical apparatus, comprising:
a power supply circuit configured to obtain operating energy from a vehicular braking indicator conductor coupled to the power supply circuit;
a control circuit coupled to the power supply circuit, the control circuit configured to operate using energy provided by the power supply circuit obtained from the vehicular braking indicator conductor;
a switching circuit coupled to the control circuit and coupleable to the vehicular braking indicator conductor, the switching circuit configured to modulate an electrical signal of the vehicular braking conductor to provide a modulated vehicular braking indicator output coupleable to a vehicular braking indicator;
wherein the control circuit is configured to control the switching circuit to provide the modulated vehicular braking indicator output including:
upon receiving the electrical signal of the vehicular braking indicator indicative of an initial brake application, modulating one or more of an output current or voltage provided to the modulated vehicular braking indicator output to vary the apparent intensity of the vehicular braking indicator according to a specified pattern during an initial modulation duration;
monitoring a duration of the initial brake application; and
in response, when the duration of the initial brake application exceeds the initial modulation duration, continuing to modulate one or more of the output current or voltage in a manner suppressing apparent variation in intensity until at least one of a release of brake application indicated by the electrical signal of the vehicular braking indicator or until a specified timeout duration lapses;
in response to monitoring the duration of the initial brake application indicative of continued brake application, and upon lapse of the timeout duration, re-establishing the modulating one or more of an output current or voltage provided to the modulated vehicular braking indicator output to vary the apparent intensity of the vehicular braking indicator according to the specified pattern for another modulation duration corresponding to the initial modulation duration;
initiating a timer upon release of brake application as indicated by monitoring the initial brake application;
detecting re-application of the brake indicated by the electrical signal of the vehicular braking indicator;
comparing a duration, indicated by the timer, between the release of brake application and an instant of re-application of the brake, to a specified threshold duration; and
in response, when the duration between release and re-application of the brake indicated by the electrical signal of the vehicular braking indicator is less than the specified threshold duration, modulating one or more of the output current or voltage in a manner suppressing apparent variation in intensity until at least one of a release of brake application indicated by the electrical signal of the vehicular braking indicator or until the timeout duration lapses; and
wherein the specified pattern includes modulating the current or voltage incrementally to gradually fade the vehicular indicator from one state to another.

9. A method for modulating apparent intensity of a vehicular braking indicator using an electrical apparatus, the method comprising:

obtaining operating energy from a vehicular braking indicator conductor;

using obtained operating energy, modulating an electrical signal of the vehicular braking indicator conductor to provide a modulated vehicular braking indicator output coupleable to the vehicular braking indicator, the modulating including:

upon receiving the electrical signal of the vehicular braking indicator indicative of an initial brake application, modulating one or more of an output current or voltage provided to the modulated vehicular braking indicator output to vary the apparent intensity of the vehicular braking indicator according to a specified pattern during an initial modulation duration;

monitoring a duration of the initial brake application; and in response, when the duration of the initial brake application exceeds the initial modulation duration, continuing to modulate one or more of the output current or voltage in a manner suppressing apparent variation in intensity until at least one of a release of brake application indicated by the electrical signal of the vehicular braking indicator or until a specified timeout duration lapses;

in response to monitoring the duration of the initial brake application indicative of continued brake application, and upon lapse of the timeout duration, re-establishing the modulating one or more of an output current or voltage provided to the modulated vehicular braking indicator output to vary the apparent intensity of the vehicular braking indicator according to the specified pattern for another modulation duration corresponding to the initial modulation duration;

initiating a timer upon release of brake application as indicated by monitoring the initial brake application;

detecting re-application of the brake indicated by the electrical signal of the vehicular braking indicator;

comparing a duration, indicated by the timer, between the release of brake application and an instant of re-application of the brake, to a specified threshold duration; and in response, when the duration between release and re-application of the brake indicated by the electrical signal of the vehicular braking indicator is less than the specified threshold duration, modulating one or more of the output current or voltage in a manner suppressing apparent variation in intensity until at least one of a release of brake application indicated by the electrical signal of the vehicular braking indicator or until the timeout duration lapses.

10. The method of claim 9, comprising:

monitoring the electrical signal of the vehicular braking indicator;

comparing a duration, indicated by the timer, to a specified sleep duration in an absence of re-application of the brake as indicated by the monitoring of the electrical signal of the vehicular braking indicator; and dissipating residual energy from an energy storage device when the comparison indicates a duration exceeding the specified sleep duration absent re-application of the brake, to establish a specified initial state of the electrical apparatus by shutting down the electrical apparatus using the dissipating.

11. The method of claim 9, comprising:

receiving the specified pattern digitally using an electrical interface; and storing the received specified pattern using a memory circuit.

12. The method of claim 11, comprising inhibiting further access to the electrical interface after receiving the specified pattern digitally.

13. The method of claim 12, wherein the inhibiting occurs at least upon installation of the electrical apparatus in a vehicle.

14. The method of claim 9, wherein the specified pattern includes modulating the current or voltage incrementally to gradually fade the vehicular indicator from one state to another.

15. The electrical apparatus of claim 1, wherein the specified pattern includes modulating the current or voltage incrementally to gradually fade the vehicular indicator from one state to another.

16. The electrical apparatus of claim 8, wherein the control circuit is configured to control the power supply circuit including:

monitoring the electrical signal of the vehicular braking indicator;

comparing a duration, indicated by the timer, to a specified sleep duration in an absence of re-application of the brake as indicated by the monitoring of the electrical signal of the vehicular braking indicator; and dissipating residual energy from an energy storage device when the comparison indicates a duration exceeding the specified sleep duration absent re-application of the brake, to establish a specified initial state of the electrical apparatus by shutting down the electrical apparatus using the dissipating.

17. The electrical apparatus of claim 8, comprising:

a housing including the control circuit and the switching circuit; and an electrical interconnect configured to conductively couple the vehicular braking indicator conductor to the electrical apparatus.

18. The electrical apparatus of claim 8, wherein the switching circuit is located in a series configuration between the modulated vehicular braking indicator output and the vehicular braking indicator conductor to provide the modulated vehicular braking indicator output by modulating a series impedance.

19. The electrical apparatus of claim 8, wherein the switching circuit is located in a shunt configuration between the modulated vehicular braking indicator output and a reference potential to provide the modulated vehicular braking indicator output by modulating a shunt impedance to divert a current coupled through the modulated vehicular braking indicator output.

* * * * *